(12) United States Patent
Curtiss et al.

(10) Patent No.: US 7,115,322 B2
(45) Date of Patent: Oct. 3, 2006

(54) HEM FLANGE

(75) Inventors: William James Curtiss, Allen Park, MI (US); Carl Rodney Roush, Grosse Ile, MI (US); Dave Henry Meyer, Saline, MI (US); Katherine P. Minnich, Lathrup Village, MI (US); Robert G. Starbowski, Brighton, MI (US); Robert William Woodall, Westland, MI (US); Scott G. Miller, Canton, MI (US); Timothy J. Moore, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 10/065,361

(22) Filed: Oct. 9, 2002

(65) Prior Publication Data

US 2003/0067187 A1 Apr. 10, 2003

Related U.S. Application Data

(60) Provisional application No. 60/328,456, filed on Oct. 10, 2001.

(51) Int. Cl.
*B32B 5/16* (2006.01)

(52) U.S. Cl. .................. 428/582; 296/146.5; 296/191; 296/29; 403/274; 29/513

(58) Field of Classification Search ............ 296/146.5, 296/191, 190.11, 146.8, 29, 76; 49/502; 403/274, 282, 335; 428/582, 594, 598; 29/521, 29/509, 243.58, 513

See application file for complete search history.

(56) References Cited

U.S. PATENT DOCUMENTS

| 1,804,658 | A |   | 5/1931  | Tarbox |
|-----------|---|---|---------|--------|
| 3,680,910 | A | * | 8/1972  | Stanner ........................ 296/29 |
| 3,861,339 | A | * | 1/1975  | Aida et al. ..................... 29/505 |
| 3,862,490 | A | * | 1/1975  | Tsuneishi et al. ............. 29/505 |
| 3,909,918 | A | * | 10/1975 | Takizawa et al. ............. 29/509 |
| 3,909,919 | A | * | 10/1975 | Miyabayashi et al. ........ 29/521 |
| 4,227,824 | A | * | 10/1980 | Ikawa ......................... 403/271 |
| 4,549,949 | A |   | 10/1985 | Guinn |
| 4,719,689 | A | * | 1/1988  | Yamamoto et al. ........... 29/458 |
| 5,207,475 | A |   | 5/1993  | Hellstrom |
| 5,237,734 | A | * | 8/1993  | Polon .......................... 29/513 |
| 5,273,606 | A | * | 12/1993 | Greve et al. ................. 156/216 |
| 5,362,120 | A |   | 11/1994 | Cornille, Jr. |
| 5,873,623 | A |   | 2/1999  | Dunton et al. |
| 6,000,118 | A | * | 12/1999 | Biernat et al. ................ 29/458 |
| 6,162,504 | A |   | 12/2000 | Hubert et al. |
| 6,368,008 | B1| * | 4/2002  | Biernat et al. ............. 403/267 |
| 6,528,176 | B1| * | 3/2003  | Asai et al. .................. 428/582 |
| 6,696,147 | B1| * | 2/2004  | Herring et al. ............. 428/323 |

* cited by examiner

*Primary Examiner*—Joseph D. Pape
(74) *Attorney, Agent, or Firm*—Gigette M. Bejin

(57) ABSTRACT

An open hem flange for a vehicle door includes an inner reinforcing panel and an outer panel having a first outer portion and a second inner portion folded about the inner panel at a base. The inner reinforcing panel includes dimpled sections against the second outer portion which provides a gap between the inner panel and the second inner portion of the outer. A gap also exists between the inner reinforcing panel and the outer portion of the outer panel to allow the hem flange to be properly cleaned and electrocoated.

7 Claims, 3 Drawing Sheets

HEM FLANGE

CROSS REFERENCE TO RELATED APPLICATIONS

This application claims the benefit of U.S. Provisional Application Ser. No. 60/328,456, filed Oct. 10, 2001.

BACKGROUND OF INVENTION

1. Field of Invention

The present invention relates to the field of vehicle doors, and more particularly, the hem flanges of vehicle doors, hoods, hatches and liftgates.

2. Background of the Invention

Vehicles generally include doors, hoods, decklids, or tailgates which each have one unitary outer panel of sheet metal. Each of these components are formed from inner and outer sheet metal panels which are connected by a hem. The outer sheet metal panel is slightly larger than the inner sheet metal panel. The outer panel of sheet metal is joined to the second inner reinforcing panel of sheet metal by hemming a flange over and along the edge of the door, hood, decklid or the like, and an adhesive is applied between the flange and the inner reinforcing panel.

According to known hemming processes, an outer sheet metal panel is stamped and formed to include a border flange along a periphery of the outer panel. An inner sheet metal reinforcing panel is formed and shaped to be slightly smaller than the outer sheet metal panel. The inner panel is placed against the outer panel such that a periphery of the inner panel is disposed adjacent and generally parallel to the border flange of the outer panel. The two panels are then secured together by hemming the border flange of the outer panel over the adjacent periphery of the inner panel.

As shown in FIG. 1, the lateral edge 19 of the outer panel 12 may be generally inclined against the inner reinforcing panel 14. To further secure the outer panel 12 to the inner reinforcing panel 14, an adhesive 17 is generally applied on the outer panel 12 prior to mating the outer panel 12 to the inner panel 14. Upon heating the assembled door arrangement, the adhesive 17 solidifies between the inner panel 14 and outer panel 12 to secure the inner reinforcing panel 14 to the outer panel 12. Furthermore, drain holes (not shown) are defined at the base 21 of the inner panel 14 to allow water to pass through.

As indicated, the traditional hem flange design implements adhesive to secure the outer panel to the inner panel. However, upon depositing the adhesive 17 and closing the hem flange 10 at the lateral edge 19 of the outer panel 12, the interior portion 18 of the hem flange 10 is closed off from being properly cleaned, phosphated and e-coated thereby resulting in the sheet metal being unprotected from corrosion. Without the proper barrier to protect the sheet metal, the hem flange may prematurely corrode.

Consequently a need has developed for a modified open hem flange design which allows the interior and exterior of the hem flange to be properly treated for protection against corrosion. The new open hem flange design eliminates the lower hem adhesive and provides a gap allowing for thorough cleaning, phosphating and e-coating of the interior and exterior of the hem flange.

SUMMARY OF INVENTION

It is a principal object of the present invention to provide a hem flange design which allows for thorough cleaning, phosphating and e-coating of the interior and exterior of the hem flange.

It is yet another object of the present invention to provide a hem flange design which allows water to easily pass through the hem flange.

It is still another object of the present invention to provide a method for manufacturing an open hem flange design.

In accordance with the above objects and other objects and features of the present invention, a hem flange design is provided As those skilled in the art will recognize, the embodiments of this invention may vary depending upon the specific requirements of a vehicle. Accordingly, the particular size and shape of the hem flange components may vary, depending upon the particular application.

The above objects and other objects, features, and advantages of the present invention are more readily understood from review of the attached drawings and accompanying specification.

DETAILED DESCRIPTION

Figure 1:
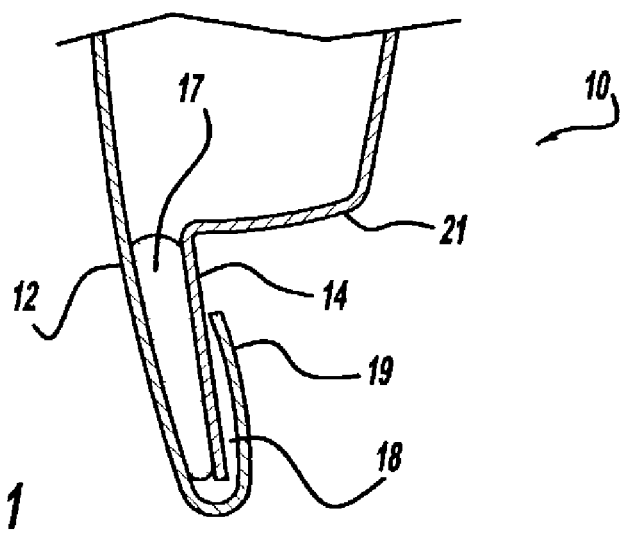
FIG. 1 is cross sectional view of a hem flange of the prior art.
Figure 2:
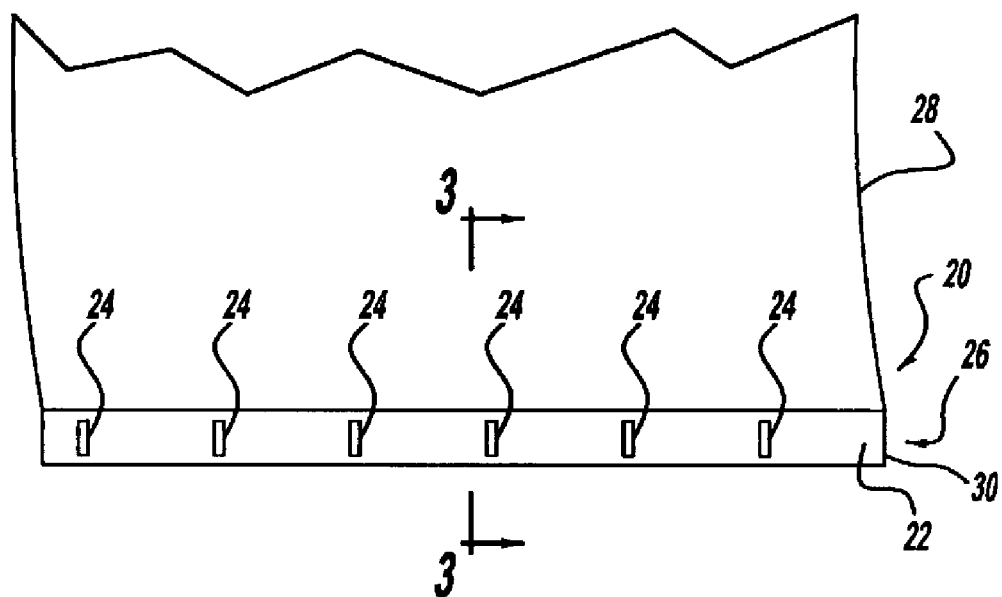
FIG. 2 is a fragmented frontal view of the hem flange of the present invention on a vehicle door.
Figure 3:
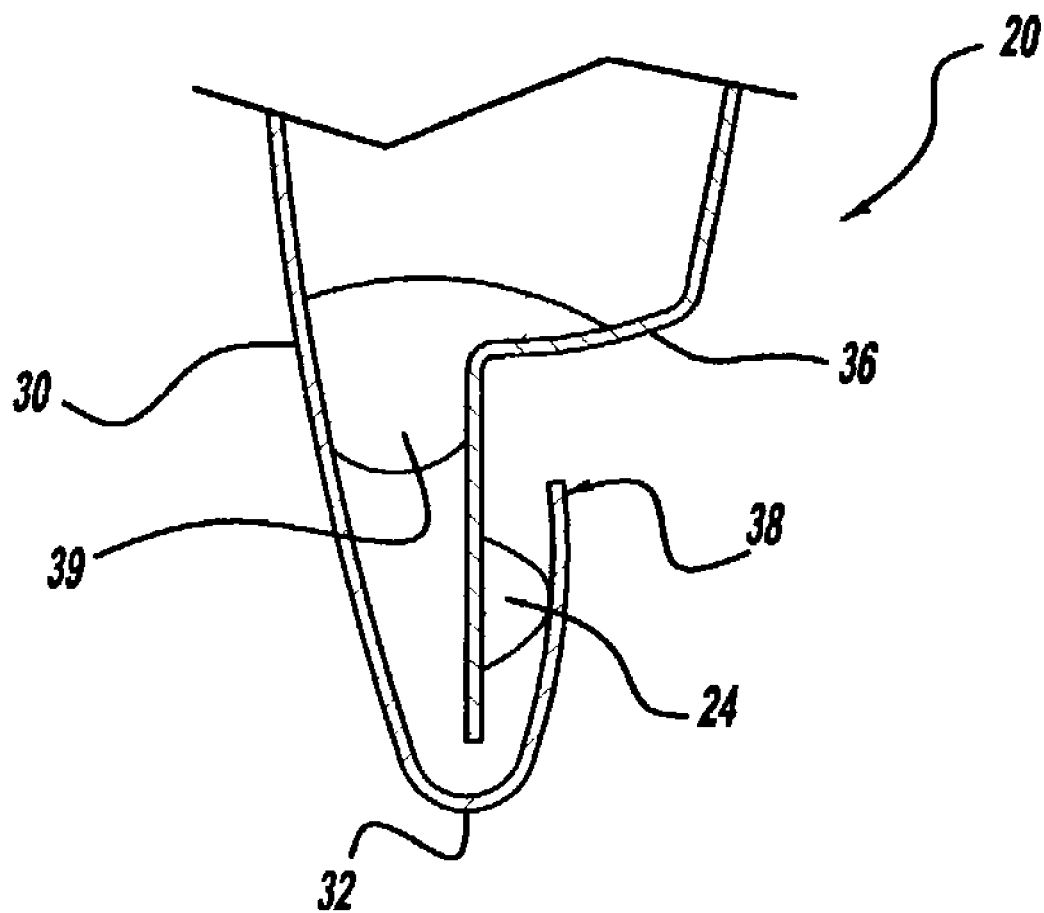
FIG. 3 is a cross sectional view of a hem flange of the present invention.

Referring now to FIG. 2, the hem flange 20 of the present invention is shown in fragmented view of the inner lower door hem. The door components may be made of steel, aluminum, magnesium or the like. As shown, the inner panel (36 shown in FIG. 3) is dimpled 24 along the lower door panel 26. The dimples 24 are placed in the inner door panel 36 just above the lower edge. The dimples 24 are preferably but not necessarily 1.5 mm tall by 4–5 mm long and 2–3 mm wide. The number of dimples 24 depends on the length of the door 28. This design placed dimples 50 mm from the front and rear edge of the inner and spaced the remaining dimples approximately 170 mm apart along the bottom. The lower door hem outside dimension is approximately 5 mm. Referring to FIG. 3, this produces a gap between the inner door panel 36 and the lateral edge 38 of the outer door panel 30.

The outer door panel 30 should also preferably be configured so that there is a gap between the outer door panel 30 and the inner door panel 36 in order to allow the e-coating, cleaning, and phosphating to thoroughly clean both sides of the inner door panel as it sits within the hem flange.

As shown in FIG. 3 of the drawings, a cross sectional view is shown where the view is taken along lines 3—3 in FIG. 2. As shown in FIG. 3, the outer panel 30 is bent at the base 32 of the outer panel 30 and up toward the other side of the inner door panel 36. Under this configuration, the bend diameter of the outer panel is not so significant to exert undue stress on the outer panel. Along the edge of the inner panel 36 are dimples 24 to provide a standoff between the inner 36 and outer 30 panels. As indicated above, a 1 mm gap should preferably exist between the lateral edge 38 of the outer door panel 30 and the inner door panel 36 to allow for washing liquids and anti-corrosion liquids to pass through the hem flange.

As shown in FIG. 3, an adhesive 39 is positioned between the outer door panel 30 and the inner door panel 36. The adhesive 39 is applied to the door structure after the electrocoating process has taken place. This secondary operation is done after the vehicle has been electrocoated at the assembly plant. The preformed stick adhesive 39 is preferably but not necessarily 5 mm in diameter and is placed into the door through an access hole at the top or middle portion of the door or through the belt line opening, depending on the design. The length of the stick is dependent on the door length. The stick adhesive self-locates in the lower door cavity during the primer bake process. As the temperature increases in the primer bake process, the adhesive stick 39 melts into the door and between the outer door panel 30 and the inner door panel 36. Once the adhesive 39 is in its proper position, the adhesive 39 bonds the inner door panel 36 and outer door panel 30 to provide additional structure and prevent unwanted noise.

Figure 4:
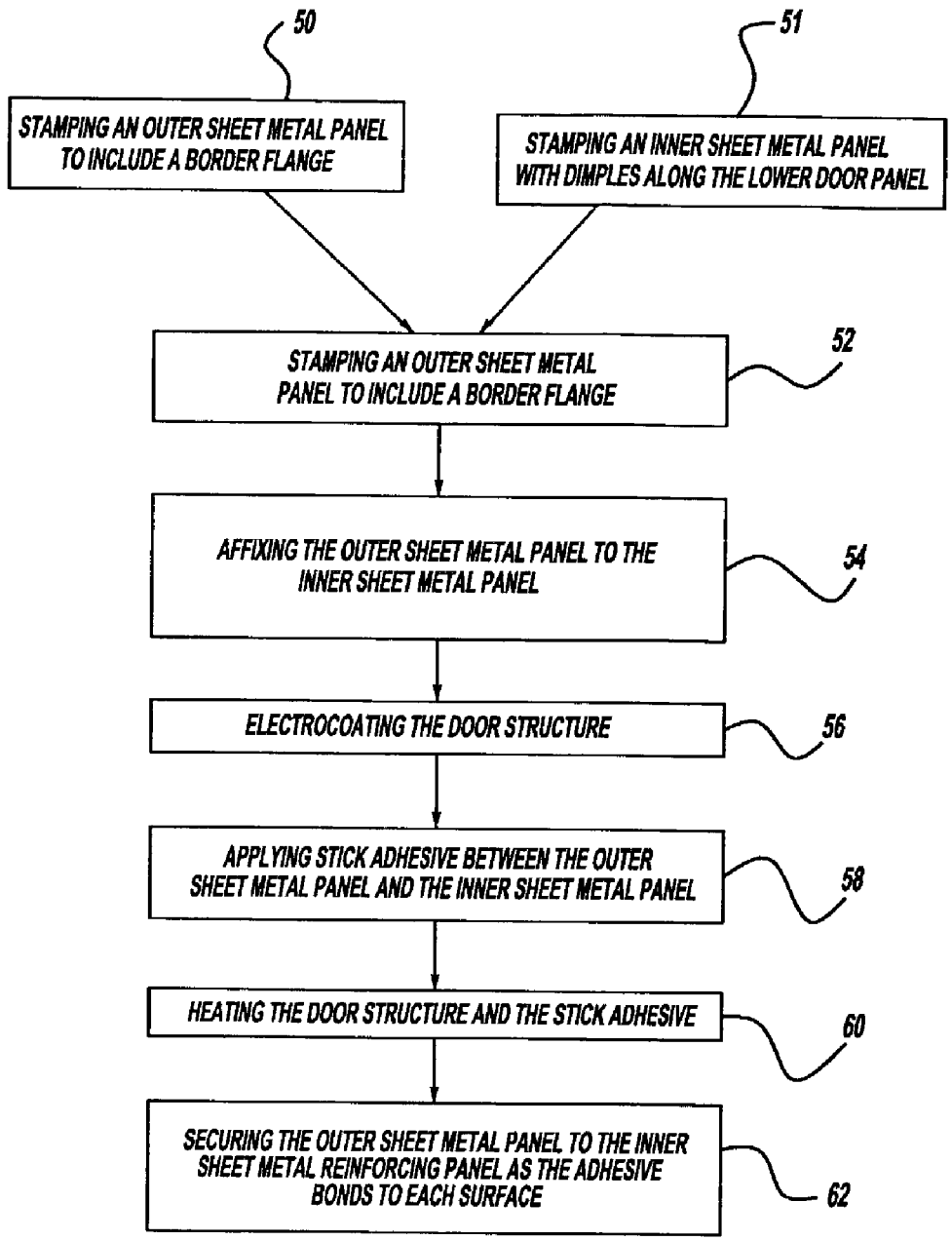
FIG. 4 is a flow chart representing the method for manufacturing the hem flange of the present invention.

Referring now to FIG. 4, a flow chart illustrating the method for manufacturing the open hem flange of the present invention is shown. The outer sheet metal panel is stamped 50 to include a border flange along the periphery of the outer sheet panel and the inner sheet metal panel is stamped 51 with dimples along the lower portion of the panel. Subsequently, the inner sheet metal reinforcing panel is nested 52 within the outer sheet metal panel. The outer sheet metal panel is then affixed to the inner sheet metal panel. Subsequently, the door structure is electrocoated 56, and a stick adhesive is applied 58 between the outer sheet metal panel and the inner sheet metal reinforcing panel. The door structure and the stick adhesive is heated 60 so that the stick adhesive melts into the door between the outer sheet metal panel and the inner sheet metal reinforcing panel. The outer sheet metal panel is then secured 62 to the inner sheet metal reinforcing panel as the adhesive bonds to each surface.

Having the described the open hem flange of the present invention and its associated manufacturing process, various advantages and uses will become apparent to those skilled in the art that modification may be made to the invention without departing from the concepts disclosed herein. Such modifications are considered as included in the following claims unless these claims by their language expressly state otherwise.

What is claimed is:

1. An open hem flange for a vehicle comprising:
    an inner panel; and
    an outer panel having a first outer portion and a second inner portion, the second inner portion being folded about the inner panel at a base of the inner panel, the inner panel having a plurality of dimpled sections for providing a standoff so that a lateral edge of the outer panel is spaced apart from the inner panel whereby liquids may pass between the inner panel and outer panel.

2. The open hem flange of claim 1 wherein the second inner portion of the outer panel and the inner panel define a gap in between.

3. The open hem flange defined in claim 1 wherein the plurality of dimpled sections are evenly spaced along the edge of the inner panel.

4. The open hem flange defined in claim 1 wherein an adhesive is disposed between the first portion of the outer panel and the inner panel.

5. The open hem flange defined in claim 1 wherein the outer portion of the outer panel and the inner panel define a second gap between the outer portion of the outer panel and the inner panel.

6. The open hem flange defined in claim 4 where the adhesive is an expandable adhesive.

7. The open hem flange defined in claim 4 wherein the adhesive is a non-expandable adhesive.

* * * * *